United States Patent Office 3,819,728
Patented June 25, 1974

---

3,819,728
PURIFICATION OF CRUDE PRIMARY ALCOHOLS
Arien Kwantes and Bernhard Stouthamer, Amsterdam, Netherlands, assignors to Shell Oil Company, New York, N.Y.
No Drawing. Filed May 18, 1972, Ser. No. 254,596
Claims priority, application Netherlands, Nov. 30, 1971, 7116417
Int. Cl. C07c 29/24, 69/82
U.S. Cl. 260—643 B      6 Claims

ABSTRACT OF THE DISCLOSURE

Crude primary alkanols of at least six carbon atoms per molecule containing aldehydes or acetals and sulfur compounds as contaminants ar purified by a process which comprises contacting the crude primary alkanol with hydrogen under pressure in the presence of a supported hydrogenation catalyst containing a noble metal of Group VIII in two successive stages wherein the initial stage is conducted in the presence of sufficient dissolved water to decompose the acetal contaminant present and at a temperature of between about 200° and about 220° C., and the subsequent stage is conducted at a temperature of between about 150° and about 180° C.

BACKGROUND OF THE INVENTION

The present invention relates to an improved process for purification of crude primary higher alkanols having at least six carbon atoms per molecule, e.g. $C_6$–$C_{20}$. More particularly the invention relates to the purification of crude primary alkanols which are intended for use in the preparation of plasticizers, e.g., compounds which are utilized in commerce for plasticizing plastics such as polyvinyl chloride. Alkanols suitable for use in preparation of plasticizers usually contan six to eleven carbon atoms per molecule. According to conventional procedures, alkanols in this carbon number range are reactive with certain dicarboxylic acids, e.g., phthalic acid or adipic acid or their anhydrides to form esters, in particular diesters, which are used as plasticizers. For most applications the diesters of phthalic acid such as ethylhexyl phthalate (DOP) are preferred.

To afford plasticizers of acceptable quality for most commercial applications the alkanols intended to be used for the preparation of plasticizers should preferably have a relatively low content of aldehydes and acetals, for instance, less than 50 parts by weight per million (p.p.m.) and the crude phthalic esters formed from these alkanols should preferably have a relatively light color, for instance, a color of less than 15 Hazen units.

The crude primary alcohols used in the preparation of plasticizers can be obtained from any conventional source. One of the most attractive sources of plasticizer range alcohols results from the hydroformylation of monoolefins in the presence of conventional hydroformylation catalysts to produce aldehydes with simultaneous reduction of the aldehydes to alcohols. For example, in a very suitable process, described in Netherlands Patent Application 267,290, crude alkanols are prepared from monoolefins, carbon monoxide and hydrogen in the presence of a hydroformylation catalyst, i.e. a complex compound which per molecule contains a transition metal with an atomic number of from 23 to 85 and at least one molecule of a biphilic ligand containing trivalent phosphorus, arsenic or antimony. The advantages of the known process are that it can be executed at relatively low pressures, that it leads to the formation of alkanols which are branched to a lesser extent than those which are obtained with dicobaltoctacarbonyl as a catalyst, and that the alkanols are formed in one stage from alkenes, carbon monoxide and hydogen, without a second stage being required for the hydrogenation of the aldehydes to alkanols.

However, the crude alkanol products resulting from conventional hydroformylation processes, such as that of the Netherlands Patent Application described above, contain somewhat higher quantities of aldehydes and acetals than are often desired for alkanols intended for use in preparation of plasticizers. Thus, it is recommended that these crude alkanols be subject to further purification including a post-hydrogenation treatment in which any aldehydes present are reduced to the corresponding alkanols and the content of acetals is lowered, prior to use in the preparation of plasticizers. The reaction product may, after separation of the hydroformylation catalyst, be treated with alkali to remove esters and carboxylic acids and, then subjected to fractional distillation for the removal of relatively low-boiling compounds such as alkenes, alkanes and water and relatively high-boiling compounds, including part of the acetals, before the post-hydrogenation step.

DESCRIPTION OF THE PRIOR ART

According to Russian Patent 246,495 the post-hydrogenation of the crude alkanol product may be effected with hydrogen under pressure at an elevated temperature in the presence of a hydogenation catalyst such as nickel, copper or platinum. A drawback of this procedure is however, that in many cases the crude alkanols will contain sulfur compounds originating from the starting materials, for instance the monoolefin feed, from which the alkanols have been prepared. Sulfur compounds are known to poison nickel- and copper-containing hydrogenation catalysts. Hydrogenation catalysts containing a noble metal of Group VIII of the Periodic Table of Elements (Platinum) are resistant to sulfur compounds. However, when the crude alkanols contain more than 1 p.p.m. of sulfur compounds and/or more than 125 p.p.m. of acetals, hydrogenation in the presence of a catalyst containing a noble metal in many cases yields treated alkanols with a total of more than 50 p.p.m. of aldehydes and acetals (calculated as carbonyl groups, one acetal molecule equalling one carbonyl group (CO)). The crude phthalic ester of the thus treated alkanols often have a relatively dark color with a Hazen value of, for instance, more than 15 units. Post-hydrogenation of low-sulfur crude alkanols (containing, for instance, 0.8 p.p.m. of sulfur) with more than 125 p.p.m. of acetals (for instance, 150 p.p.m., calculated as CO) at 170° C. yields alkanols whose crude phthalic esters often have an acceptable light color. However, these treated alkanols usually have a relatively high acetal content, for instance 50 p.p.m., so that the total content of aldehydes and acetals is also relatively high, for instance, higher than 50 p.p.m. (calculated as CO).

Thus, it would be of advantage in the production of normal alkanols intended for use in plasticizers, or for that matter, in any application where high purity normal alkanols are desired, if a purification, i.e., catalytic post-hydrogenation, process was available to reduce the aldehyde and acetal contaminants to relatively low levels, e.g., less than 50 p.p.m. total aldehydes and acetals; to afford purified alkanols which yield crude phthalate esters with relatively light color, e.g., less than 15 Hazen units; to purify crude primary alkanols contaminated with sulfur compounds without adversely affecting catalyst life.

SUMMARY OF THE INVENTION

It has now been found that crude primary alcohols which contain aldehydes or acetals or a combination thereof and, in addition at least one p.p.m. of sulfur compounds (calculated as parts by weight of elemental sulfur) are purified by a catalytic hydrogenation process which comprises contacting the crude primary alkanol feedstock with hydrogen under pressure in the presence of a supported hydrogenation catalyst containing a noble metal of Group VIII in two successive stages, the initial stage being conducted in the presence of small amounts of dissolved water and at a temperature between about 200° and about 220° C., and the subsequent stage being conducted at a temperature of between about 150° and 180° C.

The alkanols purified with the aid of the process of the present invention not only have a relatively low content of aldehydes and acetals (for instance, less than a total of 50 p.p.m., calculated as carbonyl groups (CO)), but also yield crude phthalic esters with a relatively light color (for instance less than 15 Hazen units). This result is not acheived by a one-stage hydrogen treatment at a temperature between 200° and 220° C., because the treated alkanols have a relatively high content of aldehydes, or by a one-stage hydrogen treatment at a temperature between 150° and 180° C., because then the phthalic esters of the treated alkanols have a relatively dark color. The term "CO" as utilized herein denotes the contents of aldehydes and acetals expressed in p.p.m. of carbonyl groups; in this context one acetal molecule represents one CO group.

Also the term "crude primary alkanols or alcohols" are used herein to refer to primary alkanols containing aldehydes as well as acetals and/or sulfur compounds as contaminants. The crude alkanols may contain these contaminants to a total content of, for instance, one percent, by weight. The simultaneous presence of contaminants other than aldehydes, sulfur compounds and acetals is not precluded.

DESCRIPTION OF THE PREFERRED EMBODIMENTS

Crude Primary Alcohol Feedstock

The crude primary alkanols which are suitably purified by the process of the instant invention include crude primary alkanols or mixtures of crude primary alkanols having six to twenty carbon atoms per molecule. In particular, crude primary alkanols or mixtures of crude primary alkanols having from seven to nine and from nine to eleven carbon atoms per molecule are preferred because of their utility as starting materials in the preparation of phthalate ester plasticizers. The crude primary alkanols preferably contain at least 80% m. of n-alkanols, because the phthalic esters of these alkanols have a remarkably favorable influence on the low-temperature flexibility of polymers, in particular polyvinyl chloride, into which they are incorporated and because the surface-active compounds prepared from the purified alkanols are biodegradable.

Of course, the primary alkanols purified with the aid of the process according to the present invention can be used for any purpose other than for the preparation of plasticizers. For example, they can be employed in a wide variety of industrial and consumers' goods and as starting material for the preparation of surface-active agents which are applied in those cases in which emulsifying, dispersing, wetting or detergents properties are desired.

The crude primary alkanol feedstock is derived from any conventional source. Preferred because of ease of manufacture and abundance in commerce of the necessary raw materials is the previously described catalytic hydroformylation of monoolefins utilizing conventional hydroformylation catalysts including that described in Netherlands Patent Application 267,290, discussed above.

The quantities of aldehyde or acetal and sulfur compounds present as contaminants in the crude primary alkanol feedstock are not critical since process variables such as residence time, catalyst charge quantity, catalyst concentration, and the like may be used to control the extent of hydrogenation (purification). However, in most occurrances, the maximum quantity of aldehyde, acetal and/or sulfur compound contaminants present in the crude primary alkanol feed will be in the 1%/w. range calculated as total contaminants. As indicated above the simultaneous presence of contaminants other than aldehydes, sulfur compounds and acetals is not precluded.

Catalyst

The catalyst contemplated for use in the purification of crude primary alkanols by the novel two stage catalytic hydrogenation according to the process of the invention is a noble metal of Group VIII of the Periodic Table of Elements supported on a neutral carrier.

In the process according to the present invention a wide variety of neutral carriers can be used, e.g., alumina, silica or pumice. Porous oxidic carriers are preferred, particularly the oxides of silicon and aluminium. Aluminium oxide (alumina) is preferred in particular because the noble metal, e.g., platinum is very suitably deposited on it to a high degree of dispersion and also because the metal remains very well dispersed throughout the useful life of the catalyst.

The carriers which are employed in the process according to the present invention must be neutral. A distinction exists between acidic and neutral carriers. Acidic carriers give rise to the liberation of water with the formation of ethers and alkenes and the presence of these compounds in primary alkanols is often undesired, for instance, when the alkanols are intended to be used for the preparation of plasticizers. Within the purview of the invention the acidity or neutrality of a carrier is evaluated with the aid of the following determination. The crude primary alkanols (free from esters and alkenes) are passed in the liquid phase over a candidate carrier at a space velocity of 4 liters per liter of carrier per hour at a temperature of 220° C. After 20±1 hours the quantities of ethers and alkenes are determined in a sample taken from the liquid stream just after it has passed the carrier. A carrier is considered to be acidic if the sample contains more than 1% w. of ethers and more than 0.1% w. of alkenes. A carrier is considered to be neutral if the sample contains 1% w. or less of ethers and 0.1% w. or less of alkenes.

The aluminas to be applied as a carrier are preferably prepared from commercially available aluminas and from aluminas which have been obtained according to methods known in the art, for instance, by precipitation from an aluminum-salt solution or from an aluminate solution. Many commercially available aluminas contain small quantities of contaminants, in particular bound halogen and silicon, which may render these aluminium oxides acidic within the purview of the present invention. As the carrier must be neutral, an acidic aluminium oxide must be converted into a neutral aluminium oxide during the preparation. When halogen causes the oxide to be acidic, the halogen content of the aluminium oxide can be reduced by a steam treatment at an elevated temperature; this treatment can very suitably be effected in the presence of oxygen at a temperature above 200° C., e.g., between 275° and 500° C. The steam treatment may last, for instance, from 10 to 35 hours.

Since, during the treatment with hydrogen, acetals decompose to give alkanols and aldehydes, the use of aluminium oxides which promote the decomposition of acetals into aldehydes and alkanols is preferred. Such aluminium oxides may contain weakly acidic compounds, without being rendered acidic within the purview of the present invention. Examples of such weakly acidic compounds are minor proportions chlorides and sulfates which are weakly acidic in aqueous solutions.

The specific surface area of the alumina is not critical. It has been found that the likelihood of ethers and alkenes being formed increases with increasing specific surface area. Hence, the use of aluminas with a specific surface area between 10 and 300 m.$^2$/g. is recommended. The specific surface area can be determined by the BET method, expounded by Paul H. Emmett in the Second Chapter of the book "Catalysis," volume I (Rheinhold Publishing Corporation, New York, 1954). If a commercially available aluminium oxide with a large specific surface area is acidic, this acidic aluminium oxide can be neutralized and the specific surface area reduced by heating it at a temperature above 900° C. (preferably 1000–1200° C.) and/or by the addition of an alkaline alkali-metal or alkaline-earth-metal compound.

The hydrogenation catalyst contains a noble metal of Group VIII of the Periodic Table, that is ruthenium, rhodium, palladium, osmium, iridium or platinum, platinum being preferred. The catalyst may contain mixtures of noble metals.

The noble metals of Group VIII of the Periodic Table may be deposited on the carrier by conventional methods. A preferred method is to impregnate the carrier with a solution e.g., in water of chloroplatinic acid ($H_2PtCl_6$), because this will give a highly effective catalyst which still contains a small quantity of weakly acidic compounds, without the aluminium oxide being rendered acidic within the purview of the present invention. If desired, the impregnation can be effected with a solution of tetrammine-platinum hydroxide ($Pt(NH_3)_4(OH)_2$) or rhodium nitrate ($Rh(NO_3)_3$).

The compounds of the noble metals of Group VIII of the Periodic Table may be converted on the carrier into the metal itself if any suitable way, for instance, by calcining at a temperature between, e.g., 450° and 550° C., or by reduction with for instance, hydrogen at a temperature of 150° C. or higher, e.g., 250° C. In many cases it is sufficient to heat a carrier, which supports a compound of a noble metal, e.g., a platinum or rhodium compound, in an atmosphere of hydrogen before the crude primary alkanols are contacted with the catalyst.

The quantity of the noble metal present on the carrier may vary between wide limits, the objective being to effect the desired purification with as small an amount of these metals as possible. Percentages by weight of the noble metal (calculated on the carrier) of from 0.01 to 1.0 are very suitable. It is possible to apply mixtures of noble metals.

The catalyst can be used in any form desired, e.g., in the form of powders, flakes, pellets, nibs or rings. The noble metal may be distributed over the catalyst particles in any conventional way, for instance, only on the surface of the particles or in a shell of the particles, or it may be more or less uniformly distributed within the particles. In addition, there are no limits to the dimensions of the particles; the largest dimension of a particle may vary from, for instance 0.1 to 5 mm.

Reaction Conditions

The crude primary alkanols are purified according to the process of the invention by contacting the crude primary alkanol feedstock with hydrogen under pressure in the presence of a supported hydrogenation catalyst containing a noble metal of Group VIII in two successive stages, the initial stage being conducted in the presence of small amounts of dissolved water and at a temperature of between about 200° and about 220° C. and the subsequent stage being conducted at a temperature of between about 150° and about 180° C. Thus, the crude alkanols are subjected to two successive hydrogenation treatments in different temperature ranges.

The hydrogen treatment in the first stage must not be effected at a temperature higher than 220° C. because it is probable that the resulting alkanol product will then contain a relatively large amount of alkenes and ethers, with the liberation of water, and a relatively large amount of aldehydes, with the liberation of hydrogen. A hydrogen treatment in the first stage at a temperature lower than 200° C. results in a relatively dark color for the crude phthalic esters of the treated alkanols.

The hydrogen treatment in the second stage must not be effected at a temperature lower than 150° C., because then the hydrogenation of the aldehydes is exceptionally slow, and not at temperatures higher than 180° C., because then the resulting alkanol product will have a relatively high content of aldehydes. The hydrogen treatment in the second stage is preferably effected between 165° and 175° C., because in this temperature range the aldehydes are relatively rapidly reduced to alkanols, and the purified alkanols have a relatively low content of aldehydes.

At least the initial stage of the process of the invention is conducted in the presence of dissolved water, because water causes the acetals to decompose into aldehydes and alkanols. The aldehydes formed are reduced to the corresponding alkanols. Hence, a small quantity of water must be added to crude alkanols which are water-free or contain too little water. As a rule, however, the crude alkanols will contain sufficient dissolved water to cause the acetals to decompose. Generally, it will not be necessary to remove the dissolved water in a post-treatment or to distill the purified alkanols. The quantity of water required for the decomposition of the acetals can easily be determined. As the content of acetals is, as a rule, relatively low, for instance, 250 p.p.m., calculated as CO, a small amount of water is required, generally less than 0.2% w., e.g., between 0.01 and 1.5% w.

The pressure at which the process according to the invention is conducted may vary between wide limits and depends on the requirements specified with respect to the contents of aldehydes and acetals and the color of the crude phthalate esters of the purified alkanols, and on the sulfur content of the crude alkanols. As a rule, it will not be necessary to apply pressures higher than 195 atm. abs. and the preferred range of pressures is between 48 and 145 atm. abs. These pressures are built up from the partial pressures of the crude alkanols and the hydrogen. The hydrogen with which the alkanols are contacted may be completely dissolved in the alkanols, or partly dissolved in the alkanols and partly present in the gas phase.

Although the present hydrogen treatment may be effected batchwise, it is preferably a continuous process, that is, a process in which a stream of crude primary alkanols is passed, together with hydrogen, over or through the catalyst. Space velocities (expressed in liters of liquid crude alkanols per liter of catalyst per hour) may be high, for instance, higher than 2, which leads to excellent results. This permits the use of relatively small reactors for the purification of large quantities of crude alkanols. Preferred space velocities are between 0.1 and 5 liters of crude alkanols per liter of catalyst (bulk volume) per hour. The present process may be operated in one or more reactors, for instance, each of the two stages in one or more separate reactors. The alkanols emerging from the first stage must be cooled down to a temperature between 150° and 180° C. before they enter the second stage. The catalyst utilized in the second stage is the same or different than the specific catalyst used in the first stage. However, it is preferred that the catalyst used in both stages be the same specific catalyst.

ILLUSTRATIVE EMBODIMENT I

The starting material consisted of crude primary alkanols which were at least 80% linear; their composition is given in Table A.

TABLE A

| Constituent: | Content |
|---|---|
| Heptanols | 45% w. |
| Octanols | 40% w. |
| Nonanols | 15% w. |
| Aldehydes | 1500 p.p.m. (expressed in parts by weight of CO). |
| Acetals | 260 p.p.m. (expressed in parts by weight of CO). |
| Sulfur compounds | 0.5 p.p.m. (expressed in parts by weight of sulfur). |
| Alkenes | 0.02% w. |
| Ethers | <0.5% w. |
| Water | 500 p.p.m. (w.). |

The catalyst was prepared as follows. A commercially available gamma-alumina in the form of extrudates with a diameter of 1.5 mm. was heated in a tunnel oven at a temperature of 1160° C. The resulting alumina had a specific surface area of 66 m.²/g. and a pore volume of 0.29 ml./g. Subsequently, 100 g. of the alumina thus obtained was impregnated with 40 ml. of an aqueous solution of chloroplatinic acid ($H_2PtCl_6$) containing 12.5 mg. platinum per ml. The impregnated alumina was dried at 120° C. and calcined in a rotary drum oven at a temperature of 500° C. The calcined catalyst contained 0.5% w. of patinum.

A tube with an inner diameter of 3.4 cm. was charged with the catalyst up to a height of 62 cm. Subsequently, the crude alkanols, in which hydrogen had been dissolved, were passed through the tube at a total pressure of 69 atm. abs. in the absence of a separate gas phase at a space velocity of 1 volume per volume of catalyst per hour.

Six experiments were performed. Experiments 1, 2, 3 and 5 (see Table B) are not according to the invention, because the hydrogen treatment was effected in one stage. Experiments 4 and 6 are according to the invention, because the successive hydrogen treatments were effected at 215° and 170° C., respectively. In Experiments 2–6, 3 p.p.m. of tetrahydrothiophene (calculated as sulfur) was added to the crude alkanols. In Experiments 5 and 6, moreover, 0.1% w. of water was added to the crude alkanols. The results of the six experiments are given in Table B.

TABLE B

| | | Crude primary alkanols | | Purified primary alkanols | | |
|---|---|---|---|---|---|---|
| Exp. No. | Reactor temperature, °C. | Tetrahydrothiophene added, p.p.m. S | Total content of sulfur compounds, p.p.m. S | Content of— | | Color of crude phthalate ester, Hazen units |
| | | | | Aldehydes[1] | Acetals[1] | |
| 1 | 170 | 0 | 0.46 | 20 | 70 | 100 |
| 2 | 170 | 3.0 | 3.5 | 20 | 80 | 125–150 |
| 3 | 215 | 3.0 | 3.5 | 165 | 35 | 70–85 |
| 4 { | 215 | 3.0 | 3.5 | 165 | 35 | 70–85 |
|   { | 170 | 0 | 2.0 | 16 | 10 | <5 |
| 5 | 215 | 3.0 | 3.5 | 130 | 35 | 60 |
| 6 { | 215 | 3.0 | 3.5 | 130 | 35 | 60 |
|   { | 170 | 0 | 2.0 | 18 | 12 | <5 |

[1] Calculated as p.p.m. CO.

Experiment 2 was repeated with the difference that a space velocity of 0.5 was employed. The purified primary alkanols contained 20 p.p.m. of aldehydes, 35 p.p.m. of acetals and the crude phthalate ester had a color of 60 Hazen units.

After the six experiments the contents of olefins and esters of the purified alkanols were not perceptibly higher than those of the crude alkanols.

Subsequently, another six experiments were performed under the same conditions as experiments 1–6, but in one stage at 170° C. The crude alkanols had the same contents of heptanols, octanols and decanols as given in Table A, but they contained (not according to the invention) less than 1 p.p.m. of sulfur and less than 125 p.p.m. of acetals (except in experiment 12, see Table C). Table C gives the contents of aldehydes, acetals and sulfur compounds of the crude alkanols, and the results show that these alkanols (except those of experiment 12) were capable of being purified in one stage.

TABLE C

| | | Crude alkanols | | | Purified alkanols | | |
|---|---|---|---|---|---|---|---|
| Exp. No. | Amount of hydrogen, Nl/kg. | Content of— | | Content of sulfur compounds p.p.m. S | Content of— | | Color of crude phthalate ester, Hazen units |
| | | Aldehydes[1] | Acetals[1] | | Aldehydes[1] | Acetals[1] | |
| 7 | 100 | 1920 | 10 | 0.6 | 10 | 28 | 5–10 |
| 8 | 100 | 1950 | 70 | 0.25 | 30 | 10 | 10–15 |
| 9 | 100 | 1910 | 100 | 0.6 | 20 | 10 | <5 |
| 10 | 50 | 1910 | 100 | 0.6 | 20 | 12 | <5 |
| 11 | 10 | 1910 | 100 | 0.6 | 20 | 10 | <5 |
| 12 | 100 | 1710 | 190 | 0.4 | 30 | 40 | 100–125 |

[1] Calculated as p.p.m. CO.

The color of the crude phthalic ester of the alkanols was determined by converting the alkanols into the phthalic ester (diester) by reaction with phthalic anhydried in the presence of sulfuric acid as a catalyst. This conversion was effected in a one-liter five-necked flask, equipped with a mechanical glass stirrer, which reached nearly to the bottom of the flask, a thermometer, a stopper closing one of the necks, a thermo-couple along which nitrogen could be introduced, and a reflux condenser communicating with the atmosphere. The flask was placed in a circular opening of an electrically heated body.

The flask is charged with 1.25 mol. of phthalic anhydride and 2.69 mol. of the primary alkanol (7.5% more than the stoichiometric quantity), after which, oxygen-free nitrogen is passed through at a rate of 250 ml. per minute with the stirrer adjusted to 250 revolutions per minute. After nitrogen has been passed through for 10 minutes, the esterification catalyst is added to the liquid in the flask over a period of 90 seconds at a rate of about one drop per second. The catalyst, 50% w. aqueous sulfuric acid, is applied in a quantity of 0.35% w., calculated as sulfuric acid, on the total quantity of alkanol and phthalic anhydride. After addition of the catalyst the flask is brought in 15 minutes to a temperature of 160° C. with the aid of the electrically heated body; in the next five minutes the temperature is raised to 165° C. Exactly 60 minutes after the temperature has reached 165° C., the flask is removed from the circular opening and cooled as rapidly as possible in running water. When the temperature of the contents of the flask has dropped to 75° C. a 50-ml. sample is pipetted from the mixture and its color is observed by four persons and estimated in Hazen units. The color of the crude phthalic ester is the arithmetic mean of four values in Hazen units obtained.

ILLUSTRATIVE EMBODIMENT II

The starting material consisted of crude primary alkanols which were at least 80% linear; their compositions is given in Table D.

TABLE D

| Constituent: | Content |
| --- | --- |
| Nonanols | 20% w. |
| Decanols | 45% w. |
| Undecanols | 35% w. |
| Aldehydes | 1235 p.p.m., expressed in p.p.m. of CO. |
| Acetals | 25 p.p.m., expressed in p.p.m. of CO. |
| Sulfur compounds | 4 p.p.m. expressed in p.p.m. of sulfur. |
| Water | 500 p.p.m. (w.). |

The catalyst had the same composition and had been prepared in the same way as the one applied in Illustrative Embodiment I. A tube with an inner diameter of 3.4 cm. was charged with the catalyst to a height of 62 cm. Subsequently, the crude alkanols, in which hydrogen had been dissolved, were passed through the tube at a total pressure of 69 atm. abs. in the absence of a separate gas phase at a space velocity of 1 volume per volume of catalyst per hour.

Two experiments were performed. In the first experiment (not according to the invention) the treatment with hydrogen was effected exclusively at 200–250° C. The treated alkanols contained 45 p.p.m. of aldehydes and 35 p.p.m. of acetals (both calculated as parts by weight of CO), and the color of the crude phthalate ester was 175 Hazen units. In the second experiment (according to the invention) the first experiment was repeated and the treated alkanols were passed once more through the tube at a space velocity of $1.1^{-1} \cdot h^{-1}$, this time at 170° C. At the end of the experiment the purified alkanols contained 12 p.p.m. of aldehydes, 13 p.p.m. of acetals (both calculated as p.p.m. of CO) and 3.2 p.p.m. of sulfur compounds (calculated as sulfur). The color of the crude phthalic ester was 50, a very acceptable value for these purified alkanols.

After the second experiment the purified alkanols contained less than 1% w. of ethers and less than 0.1% w. of alkenes.

The second experiment was repeated (not according to the invention), the difference being that the reaction temperature was 170° C. in both stages. After the first stage, the alkanols contained 25 p.p.m. of aldehydes and 17 p.p.m. of acetals; the color of the crude phthalate ester was higher than 250 Hazen units. After the second stage the alkanols contained 20 p.p.m. of aldehydes and 10 p.p.m. of acetals; the color of the crude phthalate ester was 250 Hazen units. After both stages the sulfur content was 3.8 p.p.m.

We claim as our invention:

1. A process for purification of crude primary alkanols having 6 to 20 carbon atoms per molecule and containing as impurities aldehydes or acetals or a combination thereof and, in addition at least one p.p.m. of sulfur compounds which comprises contacting said crude primary alkanols with hydrogen under pressure in the presence of a supported hydrogenation catalyst made up of a noble metal of Group VIII selected from the class consisting of ruthenium, rhodium, palladium, osmium, iridium and platinum, or mixture thereof supported on a neutral carrier, in two successive stages, the initial stage being conducted in the presence of sufficient dissolved water to decompose the acetals and at a temperature not higher than 220° nor lower than 200° C. and the subsequent stage being conducted at a temperature not lower than 150° nor higher than 180° C.

2. The process according to Claim 1, wherein the crude primary alkanols contain 7 to 9 carbon atoms per molecule.

3. The process according to Claim 1, wherein the crude primary alkanols contain 9 to 11 carbon atoms per molecule.

4. The process according to Claim 1, wherein the crude primary alkanols which are contacted with the hydrogenation catalyst are at least 80% m. linear.

5. The process according to Claim 1, wherein the carrier characterized for the supported hydrogenation catalyst is aluminium oxide.

6. The process according to Claim 1, wherein the noble metal of Group VIII is platinum.

References Cited

UNITED STATES PATENTS

| 2,780,643 | 2/1957 | Buchner | 260—643 B |
| 2,767,222 | 10/1956 | Mason et al. | 260—643 B |

FOREIGN PATENTS

| 246,495 | 11/1969 | U.S.S.R. | 260—643 B |

JOSEPH E. EVANS, Primary Examiner

U.S. Cl. X.R.

252—466 PT; 260—92.8 R, 475 A